(12) United States Patent
Lüdemann et al.

(10) Patent No.: US 10,195,771 B2
(45) Date of Patent: Feb. 5, 2019

(54) ROTARY PRESS AND METHOD FOR OPERATING A ROTARY PRESS

(75) Inventors: Stefan Lüdemann, Hamburg (DE); Daniel Malick, Ahrensburg (DE); Kai Hübner, Ratzeburg (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 1142 days.

(21) Appl. No.: 14/116,557

(22) PCT Filed: Apr. 19, 2012

(86) PCT No.: PCT/EP2012/001688
§ 371 (c)(1),
(2), (4) Date: Feb. 25, 2014

(87) PCT Pub. No.: WO2012/152372
PCT Pub. Date: Nov. 15, 2012

(65) Prior Publication Data
US 2014/0183787 A1 Jul. 3, 2014

(30) Foreign Application Priority Data
May 10, 2011 (DE) .................. 10 2011 101 286

(51) Int. Cl.
*B29C 43/00* (2006.01)
*B30B 11/08* (2006.01)

(52) U.S. Cl.
CPC ............ *B29C 43/003* (2013.01); *B30B 11/08* (2013.01); *B30B 11/085* (2013.01)

(58) Field of Classification Search
CPC ............................ B30B 11/085; B30B 11/08
(Continued)

(56) References Cited

U.S. PATENT DOCUMENTS 3,891,375 A * 6/1975 Pilewski ............... B30B 11/005
425/136
5,158,728 A * 10/1992 Sanderson ............... A61J 3/10
264/113
(Continued)

FOREIGN PATENT DOCUMENTS

DE 967423 11/1957
DE 10 2007 057 791 6/2009
(Continued)

*Primary Examiner* — Seyed Masoud Malekzadeh
(74) *Attorney, Agent, or Firm* — Vidas Arrett & Steinkraus

(57) ABSTRACT

The invention relates to a rotary press with a rotor, whereby the rotor comprises one upper and one lower punch guide and a die plate between the upper and lower punch guides, furthermore with upper and lower press punches which interact with the die holes in the die plate, whereby the rotary press comprises several stations, namely at least one filling station in which the material to be pressed is filled into the die holes, at least one dosing station, in which the material filled into the die holes is dosed, at least one pressing station, in which the material that has been dosed and filled into the die holes is pressed through the upper and lower press punches into pellets, and at least one ejector station in which the pressed pellets are ejected, whereby at least one of the stations can be moved from its operating position to a resting position, in which the production process of the rotary press to produce pellets remains possible with the remaining stations in their respective operating positions, and the at least one station in a resting position does not affect the production process. The invention also relates to a method for operating a rotary press.

7 Claims, 3 Drawing Sheets

(58) Field of Classification Search
USPC ... 425/344, 345, 347, 348 R, 351, 353, 355, 425/357
See application file for complete search history.

(56) References Cited

U.S. PATENT DOCUMENTS

| | | | | |
|---|---|---|---|---|
| 5,350,548 | A * | 9/1994 | Hinzpeter | B30B 11/005 264/113 |
| 7,740,468 | B2 * | 6/2010 | Lueneburg | B30B 11/08 425/193 |
| 7,942,662 | B2 * | 5/2011 | Roemer | B30B 11/08 425/345 |
| 2009/0142438 | A1 * | 6/2009 | Roemer | B30B 11/08 425/344 |
| 2009/0152751 | A1 * | 6/2009 | Roemer | B30B 11/085 264/40.1 |
| 2009/0263532 | A1 | 10/2009 | Haase et al. | |

FOREIGN PATENT DOCUMENTS

| | | |
|---|---|---|
| DE | 10 2007 061 081 | 6/2009 |
| DE | 10 2009 020 196 | 11/2010 |
| JP | 63188495 A | 4/1988 |
| JP | 63188496 A | 4/1988 |
| JP | 408692 U | 7/1992 |
| JP | 2004114135 A | 4/2004 |
| WO | 2009/112886 | 9/2009 |

\* cited by examiner

ROTARY PRESS AND METHOD FOR OPERATING A ROTARY PRESS

CROSS-REFERENCE TO RELATED APPLICATIONS

This application is a U.S. National Stage Application which claims priority to PCT/EP2012/001688, filed Apr. 19, 2012, which claims priority to DE 10 2011 101 286.2 filed May 10, 2011, the entire contents of both of which are hereby incorporated by reference.

STATEMENT REGARDING FEDERALLY SPONSORED RESEARCH

Not applicable

BACKGROUND OF THE INVENTION

The invention relates to a rotary press, in particular a rotary pelleting press, with a rotor that can usually be rotated around a vertical axis, whereby the rotor comprises one upper and one lower punch guide and a die plate between the upper and lower punch guides, furthermore with upper and lower press punches which interact with the die holes in the die plate, whereby the rotary press comprises several stations, namely at least one filling station in which the material to be pressed is filled into the die holes, at least one dosing station, in which the material filled into the die holes is dosed, at least one pressing station, in which the material that has been dosed and filled into the die holes is pressed through the upper and lower press punches into pellets, and at least one ejector station in which the pressed pellets are ejected.

The invention also relates to a method for operating a rotary press, in particular a rotary pelleting press, with a rotor that can usually be rotated around a vertical axis, whereby the rotor comprises one upper and one lower punch guide and a die plate between the upper and lower punch guides, furthermore with upper and lower press punches which interact with the die holes in the die plate, whereby the rotary press comprises several stations, namely at least one filling station in which the material to be pressed is filled into the die holes, at least one dosing station, in which the material filled into the die holes is dosed, at least one pressing station, in which the material that has been dosed and filled into the die holes is pressed through the upper and lower press punches into pellets, and at least one ejector station in which the pressed pellets are ejected This kind of rotary press is often used in different operating modes. For example, single-layer tablets can be produced with this kind of rotary press in a first operating mode and two-layer tablets in a second operating mode. Rotary presses exist that are designed in such a way that all process-relevant stations can remain in the rotary press during conversion and hereby assume new process functions. In other rotary presses, those process stations that are no longer needed and new process stations that are now needed are removed and/or fitted during a change in the operating mode. Rotary presses are known, for example, from DE 10 2007 061 081 B4 or DE 10 2007 057 791 B4. In the latter, the individual stations of the press are designed in such a way that they can be easily exchanged with each other.

Furthermore, it is sometimes necessary to dismantle or fit the rotor out of and into the rotary press in the course of the operation of rotary presses for maintenance or replacement purposes. One or more stations of the rotary press usually have to be dismantled and moved for this purpose. This applies in particular if the angular distance between two adjacent pressing stations has been designed such that the rotor cannot be passed between the pressing stations. This is the case, for example, when three pressing stations are distributed around the periphery of the rotor and these have an angular distance between each other of more than 90°, for example. WO 2009/112886 A1 describes a device and a method to exchange a die plate. Levering devices are provided with which at least one upper punch guide can be raised from the die plate. A pivot arm is also provided with which the die plate can then be swung out of the press.

The installation and removal of individual stations that is necessary to convert a rotary press between different modes of operation requires a lot of time in the known rotary presses. Furthermore, this work is usually carried out by hand, whereby trained specialists and to some extent special tools are required. There is also a risk of operating errors in the course of the manual conversion that could have a negative effect on the production process. The rotary press and/or the stations may also be damaged during the installation and removal of stations. This applies in particular during the very complicated removal of the rotor in such a rotary press. The flexibility when using such rotary presses is also restricted.

BRIEF SUMMARY OF THE INVENTION

Starting from the explained prior art, the invention is base on the task of providing a rotary press and a method of the type mentioned at the beginning, with which a conversion of the rotary press between different modes of operation is possible in a fast, simple, flexible and operationally safe way. A further task is to enable a simpler, faster and more operationally safe installation and removal of a rotor.

For a rotary press of the kind mentioned at the beginning, the invention solves the problem in that at least one of the stations can be moved from its operating position to a resting position, in which the production process of the rotary press to produce pellets remains possible with the remaining stations in their respective operating positions, and the at least one station in a resting position does not affect the production process.

The invention solves the problem for a method of the kind mentioned at the beginning through the steps:
  at least one station is moved from its operating position into a resting position,
  the production process of the rotary press then continues with the remaining stations in their operating positions, whereby the station in its resting position does not affect the production process.

The rotary press can also have control cams and/or control cam elements to guide the upper and lower punches by a method known in itself. In normal operation of the rotary press according to the invention the relevant active stations are in their operating position. They have an influence over the production process by a method known in itself. In accordance with the invention it is planned to be able to move at least one of the stations, preferably several, in particular all of the stations of the rotary press, from their operating position into a resting position or parking position. It is understood that the corresponding station or stations can be moved back out of its/their resting position into the operating position. In the resting position of individual stations, it is still possible according to the invention to operate the press correctly to produce pellets, e.g. tablets, with the remaining stations in their operating position. The remaining stations can hereby remain in their respective operating position, in which they were located before at least one station was moved to its resting position. However, it is also possible that one or more of the remaining stations are moved to an operating position different to the operating position in which they were before at least one station was moved to its resting position. The station in the resting position no longer has any (active) influence over the production process of the rotary press. The station in this resting position, for example, can be disengaged with the upper and lower punches. Cam elements that generate an axial shift of the upper and lower punches in the operating position that are assigned to one or more of the relevant stations can also be disengaged from the upper and lower punches and can be substituted, for example, by one or more transitional cam elements. This means that the process to produce pellets in the rotary press can be continued correctly without the station that has been moved to the resting position. If the station is a dosing station, for example, this dosing station no longer performs any dosing in the resting or parked position. If the station is a pressing station, for example, this pressing station no longer exerts pressure on the press punch in the resting or parked position. The dosing and pressing necessary for the production process is then performed by other dosing and pressing stations in the rotary press.

Whereas it is in principle possible for all stations of the rotary press to be moved to a resting position, it can be provided that (only) the pressing stations and the dosing stations and possibly the filling stations can be moved to a resting position. These are the stations that would normally have to be removed or installed when changing the mode of operation, for example when changing from the production of single-layer tablets to multi-layer tablets.

The resting position provided for according to the invention permits the flexible use of individual stations of the rotary press without a complicated installation or removal of the stations. Rather, a fundamentally new machine concept is enabled with which the rotary press can be easily adjusted to different production conditions by providing suitable stations. For example, three different production methods to produce a single-layer tablet are possible with a rotary press with three pressing stations, as is the adjustment of the rotary press to produce two-layer tablets. The rotary press can be flexibly and quickly converted between various operating modes. The production process only has to be interrupted temporarily to move the corresponding station or stations to the resting position or move them back from the resting position into the operating position. The rotary press can then be operated again in the new operating mode while the corresponding stations that have been moved to their respective resting position remain in this resting position.

The rotary press may have a housing in which the rotor and the stations are arranged. According to one embodiment, the at least one station in the resting position can still be within the housing. The station is therefore moved from the operating position in its resting position and vice versa within the housing. The stations are within the housing anyway in the operating position. In that the stations are also positioned within the housing in their resting position, the rotary press can continue to be operated after one or more stations have been moved to the resting position with the housing closed. The housing of the rotary press then may only have to be opened to change between the respective operating position and corresponding resting position and vice versa if the corresponding station is moved between its operating and resting position by manual intervention. However, if the corresponding station is moved automatically with no manual intervention in the station, the housing can remain closed for this process. The same applies for any replacement of cam elements assigned to the station in the resting position by transitional cam elements that may be necessary. If this is also performed automatically and does not have to be done by hand by specialists, the housing does not have to be opened at all. A conversion of the rotary press in this respect is advantageous, particularly for applications in the pharmaceuticals industry, where very high demands are made on the product purity.

The rotary press can have several filling stations and/or several dosing stations and/or several pressing stations, whereby several of the filling stations and/or dosing stations and/or pressing stations, preferably all of the filling stations and/or dosing stations and/or pressing stations can be moved to the resting position. It is understood that one filling station, one dosing station and one pressing station each has to remain in its operating position for a correct further operation of the rotary press.

According to a further embodiment, the at least one station may be further away from the die plate in its resting position than in its operating position, viewed in the axial direction of the rotor. The at least one station is thus moved further away from the die plate during the movement to its resting position in the axial direction of the rotor. In this way a correct further operation of the rotary press is possible in a very simple manner without the station in the resting position affecting the process. The at least one pressing station may have an upper pressure roller arranged above the die plate and a lower pressure roller arranged below the die plate. The pressure rollers may then be able to be moved from their operating position into a resting position in which, in the axial direction of the rotor, they are in turn further away from the die plate than in their operating position. Once again, the pressure rollers are moved further away from the die plate in an axial direction to move the pressing station into the resting position. It is understood that with several pressing stations, all of the pressing stations in the rotary press can have such pressure rollers.

The movement of at least one station from the operating position into the resting position and vice versa can be carried out manually. However, it is also possible for the rotary press to have driving gear with which the at least one station can be moved between its operating position and its resting position. Such driving gear can be an electric or hydraulic drive, for example. The driving gear can be controlled by the machine controller for the rotary press or the control station of the rotary press, for example. An automatic movement of individual stations between the operating position and the resting position is also possible, for example depending on a preset operating mode of the press, e.g. in a single-layer or multi-layer tablet production process. The operating mode can be pre-set by an operator of the rotary press. In order to ensure that the respective station in the resting position cannot affect the production process in an unwanted manner, further locking devices may be provided with which the at least one station can be or is locked in its resting position. The aforementioned automatic movement of individual stations between the operating position and resting position can also comprise the substitution of cam elements assigned to the stations that are engaged with the upper and lower punches by transitional cam elements, and vice versa.

According to a further embodiment, the rotor can be accessible for an installation and removal if at least one of the stations is in the resting position. Accordingly, the rotor can be installed and/or removed once at least one station has been moved go the resting position. The angular distance between remaining stations can thus be enlarged so that the removal of the rotor may be or is possible without dismantling stations of the rotary press, for example the pressing stations or dosing stations. This applies in particular if one or several, in particular all pressing stations and/or pressure rollers of the rotary press are in their resting position. In particular with large angular distances between two pressing stations in the sense described above, e.g. greater than 90°, this is a considerable advantage since in such a case the pressing stations have had to be dismantled by a complicated method up to now.

The method according to the invention can be carried out with the rotary press according to the invention. Accordingly, the rotary press according to the invention is suitable to carry out the method according to the invention.

BRIEF DESCRIPTION OF THE SEVERAL VIEWS OF THE DRAWINGS

An exemplary embodiment of the invention will be explained in more detail in the following on the basis of figures. The figures diagrammatically show.

DETAILED DESCRIPTION OF THE INVENTION

Figure 1:
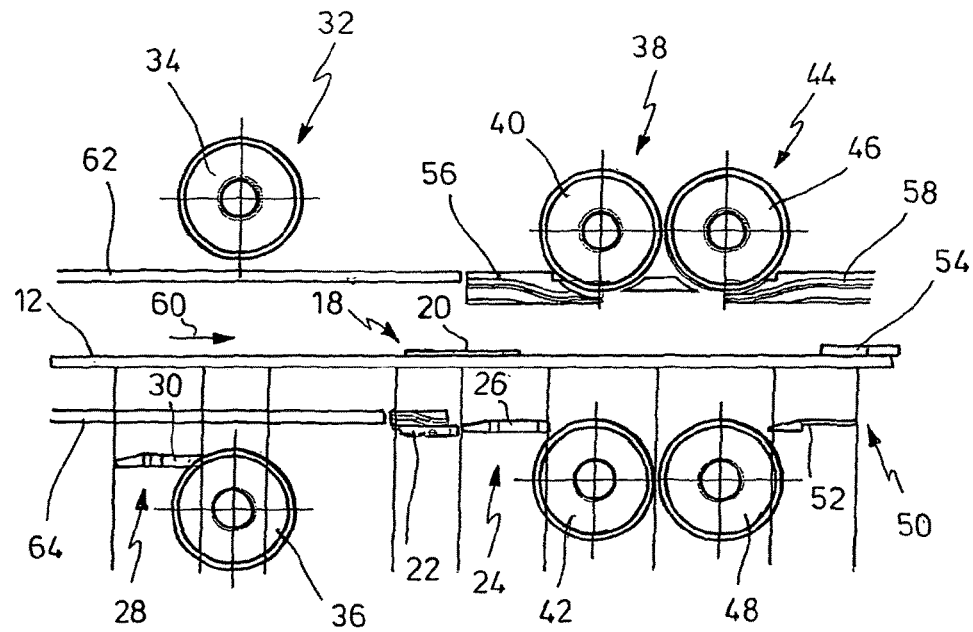
FIG. 1 a part of a rotary press according to the invention in a representation uncoiled in the plane of the drawing in an initial operating state, FIG. 2 the rotary press shown in FIG. 1 in a second operating state, FIG. 3 the rotary press shown in FIG. 1 in a third operating state, FIG. 4 the rotary press shown in FIG. 1 in a fourth operating state, and FIG. 5 the rotary press shown in FIG. 1 in a fifth operating state.

While this invention may be embodied in many different forms, there are described in detail herein a specific preferred embodiment of the invention. This description is an exemplification of the principles of the invention and is not intended to limit the invention to the particular embodiment illustrated.

Unless otherwise specified, the reference numerals in the figures refer to the same objects. The rotary press according to the invention shown in FIG. 1 comprises a rotor that can be rotated around a normally vertical axis by a drive not shown in more detail here, comprising an upper and lower punch guide by a method known in itself not shown in detail here, between which a die plate 12 is arranged. The die plate 12 has several die holes that are also not shown in detail here, with which the upper and lower press punches interact by a method known in itself, as demonstrated for example in FIGS. 2 to 4 on the basis of a pair of punches consisting of an upper punch 14 and lower punch 16. It is understood that the rotary press comprises a number of these upper and lower punches 14, 16 according to the number of holes in the die plate 12. The basic design of such a rotary press is known in itself and will therefore not be explained in more detail.

The rotary press includes cam elements as part of guide cams for the upper and lower punches as well as several stations. As can be seen in FIG. 1, the rotary press in particular includes a filling station 18 with a filling device 20, in which powdered material is filled into the die holes of the die plate 12. The filling station 18 also consists of a filling cam element 22, which guides the lower punches 16 before filling the die holes. The rotary press also has a first dosing station 24 with a first dosing cam element 26 that sets the height of the lower punch 16 depending on the desired dosing in the die holes. Furthermore, the rotary press has a second dosing station 28, which includes a second dosing cam element 30. The rotary press also comprises a first pressing station 32 with an upper pressure roller 34 and a lower pressure roller 36, a second pressing station 38 with an upper pressure roller 40 and a lower pressure roller 42 and a third pressing station 44 with an upper pressure roller 46 and a lower pressure roller 48. During operation, the upper and lower pressure rollers 34, 40, 46 and 36, 42, 48 of the pressing station 32, 38, 44 interact in an as such known manner with the upper and lower punches 14, 16, to press the material filled and dosed in the filling station 18 and dosing stations 24, 28 into the die holes into pellets and/or tablets. Finally, the rotary press comprises an ejector station 50 with an ejector cam element 52 and a stripper element 54. By a similar method known in itself, the ejector cam element 52 guides the lower punches 16 upwards so that this transports the pressed tablets to the upper side of the die plate 12 where they are fed to a tablet outlet channel by the stripper element 54, for example. The rotary press also displays pressure cam elements 56, 58, whereby the pressure cam element 56 guides the upper punches 14 axially in front of the second pressing station 38 and the pressure cam element 58 guides the upper punches 14 after exiting the third pressing station 44. During operation, the rotor of the rotary press, in particular the die plate 12, with the upper and lower punch guides and the upper and lower punches 14, 16, rotates around a generally vertical axis, as indicated by the arrow 60 in FIG. 1.

In the rotary press shown in FIGS. 1 to 5, all of the pressing stations 32, 38, 44 and all of the dosing stations 24, 28 can be moved between their operating position and a resting position. In the example shown, the stations are moved in an axial direction of the rotor away from the die plate 12, viewed from the latter, to move them from the operating position into the resting position. In the first operating state according to FIG. 1, the first pressing station 32 in particular is in the resting position. To this end, the upper pressure roller 34 and lower pressure roller 36 of this first pressing station 32 are moved up and down further away from the die plate 12. In FIG. 1 it can be seen directly that the second and third pressing station 38, 44, in particular their pressure rollers 40, 42, 46, 48, are closer to the die plate 12 than the pressure roller 36 of the first pressing station 32. The upper and lower transitional cam elements 62, 64 are inserted in the area of the first pressing station 32 which is in the resting position. These transitional cam elements 62, 64 substitute the cam elements 56 and 22, 30 assigned to the relevant station in the operating position in the resting position. For this purpose, these cam elements 56, 22, 30 that guide the upper and lower punches 14, 16 axially, have to be disengaged from the latter and substituted by the transitional cam elements 62, 64, which now have to bridge the no longer existing cam elements 56, 22, 30. This substitution can be carried out by hand by the specialists. However, a fully automatic substitution is also possible.

In addition, the second dosing station 28 is also in its resting position in the first operating state shown in FIG. 1. This dosing station 28 too, in particular the second dosing cam element 30, has been moved in an axial direction, in FIG. 1 downwards away from the rotor and the die plate 12.

It is again directly visible that the first dosing station 24 in FIG. 1 is closer to the die plate 12 than the second dosing station 28.

If the rotary press shown in FIG. 1 is now operated, only the first dosing station 24 and the second and third pressing station 38, 44 along with the filling station 18 and the ejector station 50 are involved in the process. The first pressing station 32 and the second dosing station 28, on the other hand, have no effect on the production process in the resting position shown in FIG. 1. No dismantling of the corresponding stations is necessary here. Rather, the rotary press has a housing not shown in FIG. 1, whereby all stations of the rotary press that can be moved between and operating position and a resting position also remain within the housing in their resting position.

Figure 2:
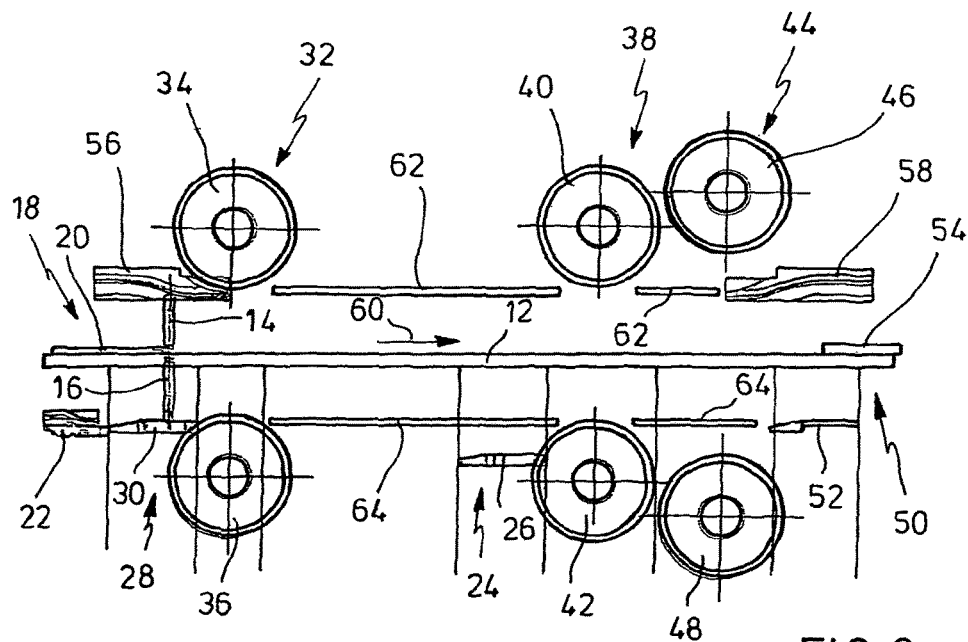

FIG. 2 shows a second operating state of the rotary press shown in FIG. 1. The first pressing station 32 is hereby in its operating position. To this end, it has been moved in an axial direction towards the die plate 12 compared to the representation in FIG. 1. The pressure rollers 34, 36 in particular have been moved towards the die plate 12. Furthermore, the second dosing station 28 has been moved into its operating position by moving the second dosing cam element 30 in the direction of the die plate 12. In contrast to FIG. 1, the third pressing station 44 has been moved to its resting position in FIG. 2, for which in turn the pressure rollers 46, 48 have been moved further away from the die plate 12. The same applies for the first dosing station 24, which has also been moved to its resting position by moving the dosing cam element 26 further away from the die plate 12. A transitional cam element 64 has been inserted in its place. The transitional cam element 62 has been inserted in place of the first pressure cam element 56 above the die plate 12. The job of the transitional cam elements 62, 64 has already been explained above. The principle of substitution described above can be transferred in principle and analogously to all stations that are moved from an operating to a resting position. A first pressure cam element 56 is now located in front of the first pressing station 32. In addition, the filling station 18 including its filling device 20 and the filling cam element 22 has been positioned in front of the second dosing station 28. Again, correct operation of the rotary press is possible with the second operating state shown in FIG. 2.

Figure 3:
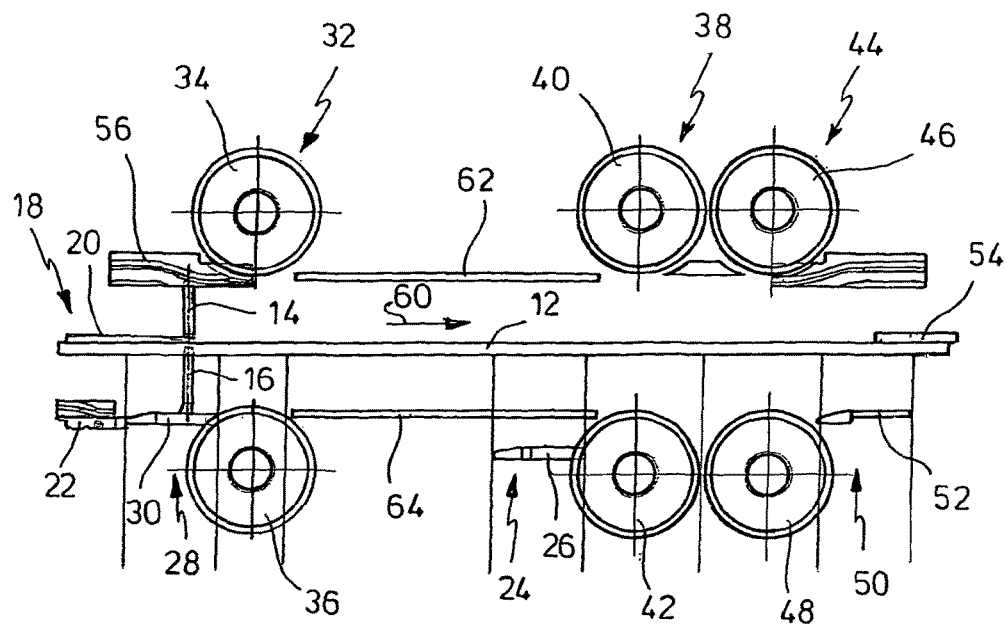

FIG. 3 shows a further, a third operating state for the rotary press. In this operating state, all stations of the rotary press except the first filling station 24 with the first filling cam element 26 are in their operating position. Again, correct operation of the rotary press is possible in this operating state.

In the operating states of the rotary press shown in FIGS. 1 to 3, tablets can be produced in single-layer mode in different configurations.

Figure 4:
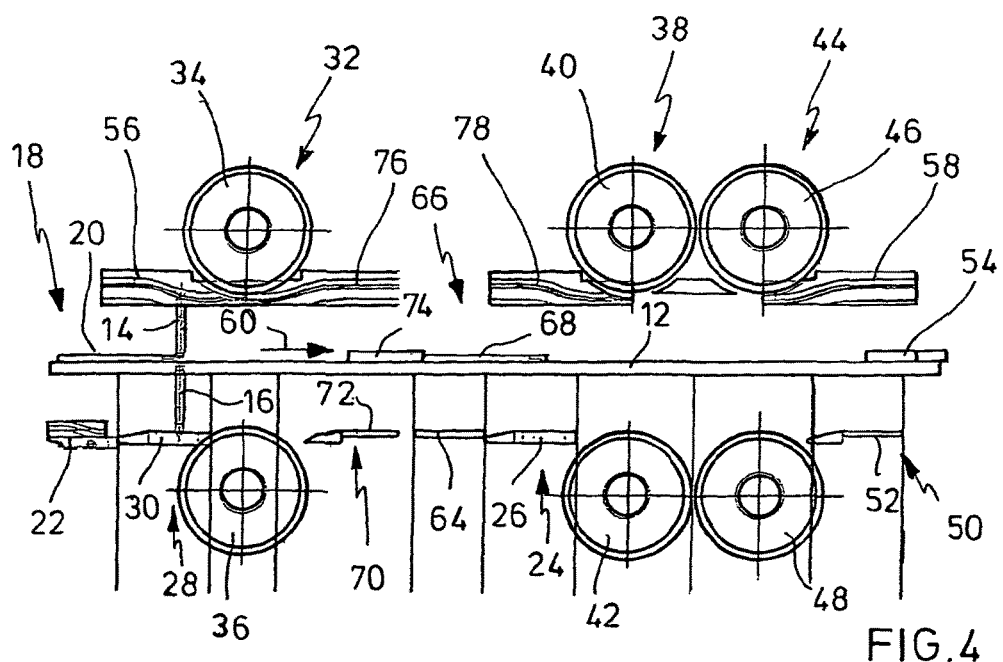

FIG. 4 shows another, a fourth operating state in which two-layer tablets can be produced with the rotary press. For this purpose, all stations of the rotary press are in their operating position. In addition, a second filling station 66 with a second filling device 68 has been arranged between the first pressing station 32 and the second pressing station 38. During operation, a first powdered material is filled into the die holes in the first filling station 18 and dosed in the second dosing station 28, whereby the material is then pre-compacted in the first pressing station 32. A second powdered material is then filled onto the pre-compacted pellet from the first powdered material in the second filling station 66 with the second filling device 68 and dosed in the first dosing station 24. This is followed by pressing into a two-layer tablet in the second and third pressing stations 38, 44, whereby pre-compacting is carried out in the second pressing station 38 and final pressing of the two-layer tablet in the third pressing station 44. The two-layer tablets produced in this way can then be ejected in the ejector station 50. Fig. also shows a second ejector station 70 with a second ejector cam element 72 and a second stripper element 74. Pellets can optionally be ejected here after filling in and compacting the first powdered material, for example to a testing station. It should also be mentioned that further pressure cam elements 76, 78 are arranged between the first pressing station 32 and the second pressing station 38 in the operating state in FIG. 4.

Figure 5:
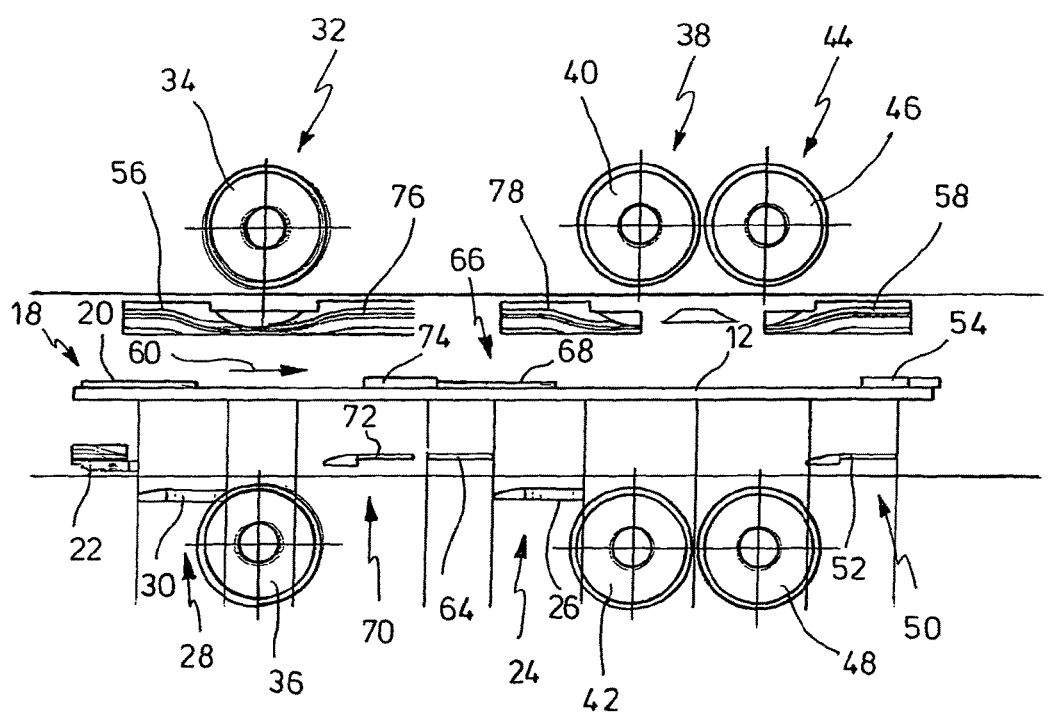

FIG. 5 shows a fifth operating state of the rotary press that is used for the removal of the rotor, in particular the die plate 12 with the upper and lower punch guides. All dosing stations 24, 28 and all pressing station 32, 38, 44 have been moved to their resting position here. A rotor can be easily replaced in this state without having to dismantle the dosing stations 24, 28 or pressing stations 32, 38, 44.

All stations of the rotary press that can be moved between an operating position and a resting position can be moved manually or by means of suitable drives, for example electric or hydraulic drives, between the resting and the operating position. Furthermore, locking devices can be provided with which the stations can be locked in the resting position. The movement of the individual stations between the operating position and the resting position can be carried out automatically if suitable drives are provided, for example by the machine controller of the rotary press. The stations can thus be moved automatically to their operating or resting position depending on the respective operating mode selected for the press.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A rotary press with a rotor, whereby the rotor comprises one upper and one lower punch guide and a die plate (12) arranged between the upper and lower punch guides, furthermore with upper and lower press punches (14, 16) which interact with the die holes in the die plate (12), whereby the rotary press comprises several stations, comprising at least one filling station (18, 66) in which material to be pressed is filled into the die holes, at least one dosing station (24, 28), in which the material filled into the die holes is dosed, at least one pressing station (32, 38, 44), in which the material that has been dosed and filled into the die holes is pressed through the upper and lower press punches (14, 16) into pressed pellets, and at least one ejector station (50, 70) in which the pressed pellets are ejected, characterized in that at least one of the several stations can be moved from its operating position to a disengaged resting position while a production process of the rotary press to produce pellets remains in an active state with the remainder of the several stations in their respective operating positions, such that the at least one of the several remaining stations in its resting position does not affect the production process, and further wherein the rotary press has a driving gear with which the at least one of the several remaining stations can move automatically between its operating position and its resting position, and further characterized in that the rotary press has a housing in which the rotor and the stations are arranged, whereby the at least one station in the disengaged resting position and the remainder of the several stations in their respective operating positions in the active state remain inside the housing.

2. The rotary press according to claim 1, characterized in that the rotary press has several filling stations (18, 66) and/or several dosing stations (24, 28) and/or several pressing stations (32, 38, 44), whereby several of the filling stations (18, 66) and/or dosing stations (24, 28) and/or pressing stations (32, 38, 44), wherein all of the filling stations (18, 66) and/or dosing stations (24, 28) and/or pressing stations (32, 38, 44) can be moved to the resting position.

3. The rotary press according to claim 1, characterized in that the at least one station is further away from the die plate (12) in its resting position in the axial direction of the rotor than in its operating position.

4. The rotary press according to claim 1, characterized in that the at least one pressing station (32, 38, 44) has a pressure roller (34, 40, 46) arranged above the die plate (12) and a pressure roller (36, 42, 48) arranged below the die plate (12), whereby the pressure rollers (34, 36, 40, 42, 46, 48) can be moved from their operating position into a resting position in an axial direction of the rotor in which they are further away from the die plate (12) than in their operating position.

5. The rotary press according to claim 1, characterized in that it has a locking device with which the at least one station can be locked in its resting position.

6. The rotary press according to claim 1, characterized in that the rotor is accessible for installation and/or removal if at least one of the stations is in the resting position.

7. The rotary press according to claim 1, characterized in that in the course of transferring the at least one station from its operating into a resting position, at least one cam element assigned to the station is substituted by at least one transitional cam element.

* * * * *